United States Patent [19]
Lock et al.
[11] 3,721,628
[45] March 20, 1973

[54] FERROELECTRIC MATERIALS AND INFRARED DETECTOR DEVICE CONTAINING SAME

[75] Inventors: Peter John Lock, Chandlersford; Edward Thomas Keve, Wembley, both of England

[73] Assignee: U.S. Philips Corporation, New York, N.Y.

[22] Filed: April 26, 1971

[21] Appl. No.: 137,174

[30] Foreign Application Priority Data

April 24, 1970 Great Britain....................19,842/70
Jan. 5, 1971 Great Britain..........................440/71

[52] U.S. Cl.............252/62.9, 250/83 R, 250/83.3 H
[51] Int. Cl...............................................G01t 1/202
[58] Field of Search........252/62.9; 250/83 R, 83.3 H

[56] References Cited

UNITED STATES PATENTS

| | | | |
|---|---|---|---|
| 2,661,433 | 12/1953 | Jaffe | 252/62.9 X |
| 3,085,184 | 4/1963 | Nitsche et al | 252/62.9 |

*Primary Examiner*—Oscar R. Vertiz
*Assistant Examiner*—J. Cooper
*Attorney*—Frank R. Trifari

[57] ABSTRACT

An organic pyroelectric material such as triglycine sulphate in which a permanent poling of the crystal is effected by addition of a doping ingredient possessing pseudosymmetry.

The poled crystal may be used for constructing an optical device or a pyroelectric detector.

5 Claims, 12 Drawing Figures

*INVENTORS*
PETER JOHN LOCK and
EDWARD THOMAS KEVE

BY [signature]
AGENT

*INVENTOR*.S
PETER JOHN LOCK and
EDWARD THOMAS KEVE
*BY* [signature]
AGENT

FERROELECTRIC MATERIALS AND INFRARED DETECTOR DEVICE CONTAINING SAME

This invention relates to ferroelectric materials. It relates specifically to ferroelectric materials which owe their ferroelectric behavior to the presence of molecules or atomic groups in positions of pseudosymmetry. Operation of a ferroelectric switching mechanism may then take place by inversion in the pseudosymmetry elements such that atoms interchange environments in the molecule.

In this specification, the term 'ferroelectric switching' means a change in the direction of the spontaneous polarization from one state to another in a ferroelectric material, both of the states being stable in an applied electric field of zero intensity. 'Prevention' of such a switching or inversion action means that only one state of the two polarization states will be stable in a zero applied field.

'Pseudosymmetry' elements means symmetry elements which a crystal possesses above its Curie temperature but which are broken below the Curie temperature.

Certain materials of this type are organic pyroelectric materials such as triglycine sulphate, triglycine selenate and triglycine fluorberyllate, and also such compounds in which part of the hydrogen present is replaced by deuterium and mixtures containing more than one of these compounds.

The present specification discloses inter alia a method of preparing a crystal of ferroelectric material in a state having a constant sense of spontaneous electrical polarization throughout such that the crystal is permanently 'poled.' Sometimes there can also be an improvement in the pyroelectric coefficient or the useful electrical resistivity of the crystal.

According to the invention, there is provided a poled crystal of a ferroelectric material, the material including a doping ingredient effective to prevent a ferroelectric inversion in the crystal. The doping ingredient may be a molecule capable of taking the place of an original molecular group in the crystal, the doping molecule being without the symmetry element required for switching of the ferroelectric material.

The ferroelectric crystal may be triglycine sulphate, triglycine selenate, triglycine fluoroberyllate, a deuterated form of any of these compounds or a mixture thereof. The doping ingredient may be one or more of α-alanine, α-amino-n-butyric acid, sarcosine or serine.

According to a feature of the invention, there is provided a piezoelectric material consisting essentially of triglycine sulphate or triglycine selenate or any mixture of the sulphate and selenate doped with an organic ingredient whereby the material is spontaneously polarized so that there is a dominant directional arrangement of the dipoles in the crystal.

According to a further feature of the invention, there is provided a method of preparing a poled crystal of a ferroelectric material in which operation of a ferroelectric switching mechanism takes place by inversion of pseudosymmetry elements within the crystal, in which the material is crystallized from a solution including a doping ingredient which is capable of preventing said inversion.

The invention also comprises an optical device or a pyroelectric device such as a pyroelectric detector or image tube including a poled crystal as described above or when made by one of the aforementioned methods.

By way of example, particular embodiments of the invention will be further described with reference to the accompanying drawing, in which.

Figure 1:
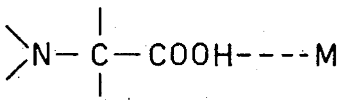
FIG. 1 is a schematic structural representation of glycine, the relevant constituent of triglycine sulphate.

For the experimental work which is about to be described, the ferroelectric material having the necessary features of symmetry and the required switching mechanism was chosen for convenience as triglycine sulphate. A schematic structural representation of the relevant part of this crystal is given in FIG. 1. The position of the plane of symmetry in the molecule is indicated by the dotted line M.

Figure 2:
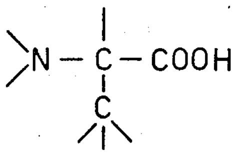
FIG. 2 shows the α-alanine molecule.

The structural representation for α-alanine is given in FIG. 2.

Crystals of triglycine sulphate doped with α-alanine were prepared in the following way.

In a 500 c.c. dish, 130 g. of pure triglycine sulphate (purity better than a few parts per million) and 20 g of α-alanine were made up to 400 c.c. with demineralized water and stirred for 30 minutes to dissolve at room temperature. The dish was placed in an enclosure and the temperature maintained at 30°C for two weeks. During this time, self-seeded crystals of α-alanine doped triglycine sulphate separated out, the crystals were removed from the solution and washed and dried.

The triglycine sulphate used for this preparation may be of commercial origin or may be made from glycine and sulphuric acid.

Figure 8:
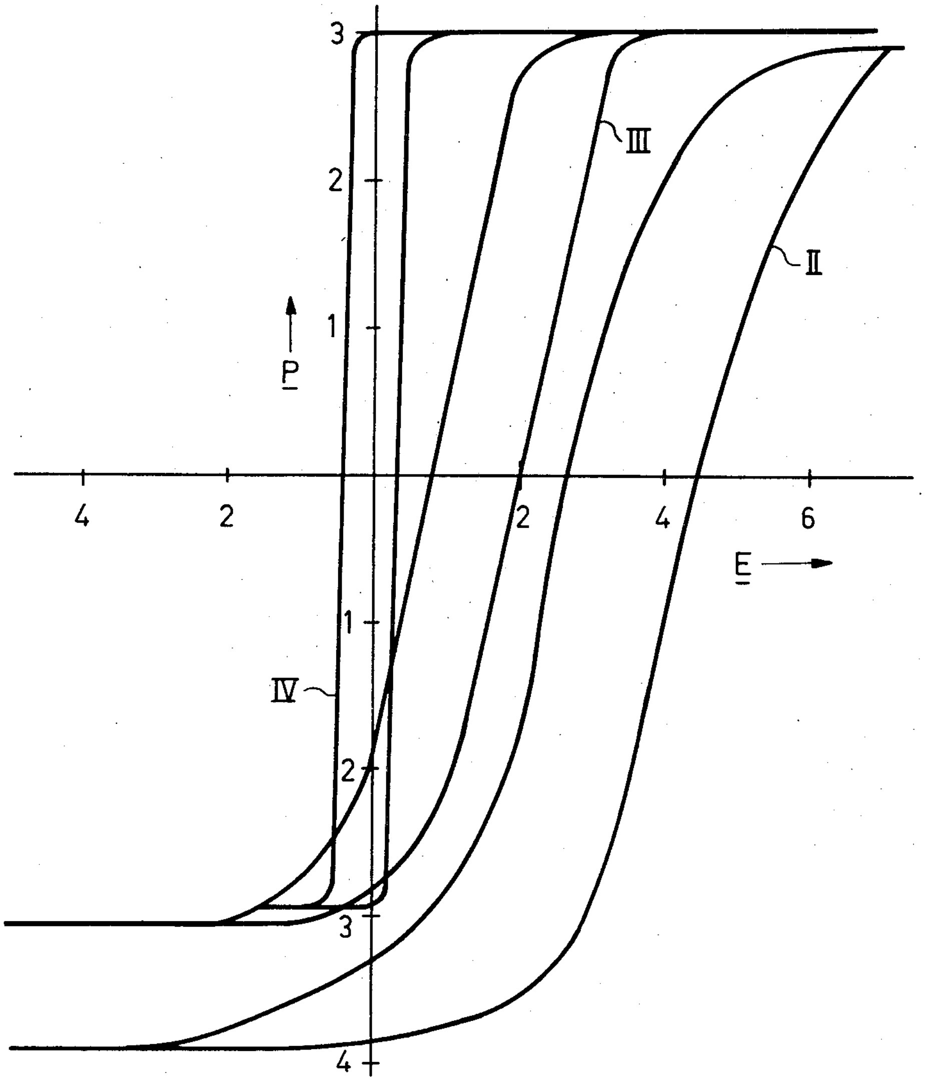
FIG. 8 is a graph showing electrostatic hysteresis loops illustrating the dielectric behavior of crystals of triglycine sulphate containing different dopants.

An electrostatic hysteresis loop of material from a crystal prepared in this way is shown by the curve II in FIG. 8. The vertical axis indicates the state of polarization P of the specimen in microcoulombs $cm^{-2}$ for a polarizing field E given on the horizontal axis in $kV.cm^{-1}$.

Figure 3:
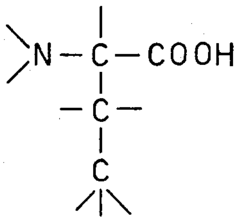
FIG. 3 shows the α-amino-n-butyric acid molecule.

In order to test the method of the invention, a structural consideration was made with the result that the compound α-amino-n-butyric acid was considered to lack a mirror plane of symmetry and at the same time it was thought to be capable of taking the place of glycine in the crystal lattice. Therefore it appeared possible that it would act as a suitable doping ingredient. FIG. 3 depicts the schematic structural representation of this molecule.

Crystals of triglycine sulphate doped with α-amino-n-butyric acid were then prepared by a method similar to that already described. After identification of cleavage planes in the crystals, slices were cleaved from them and the slices were then etched and fitted with suitable electrodes to enable electrical measurements to be made.

In this way slices having a thickness of 0.35 mm and diameter 4.1 mm were made available for testing. The capacity across the electrodes was determined as about 12.3 pF (pico Farad=10—12 Farad) and a measured conductance of G < 0.002 × $10^{-6}$ ohm$^{-1}$ was obtained. A corrected value for resistivity was 2.5 × $10^{9}$ ohm cm. The apparent pyroelectric coefficient was 3 × $10^{-8}$ coulombs cm$^{-2}$·°C$^{-1}$.

An electrostatic hysteresis loop for the α-amino-n-butyric acid doped crystal is shown by the curve III in FIG. 8. This loop is seen to be displaced to a substantial extent in the X-direction from the origin showing that in the absence of an applied external polarizing field there is a dominant directional arrangement of the dipoles in the crystal.

Figure 4:
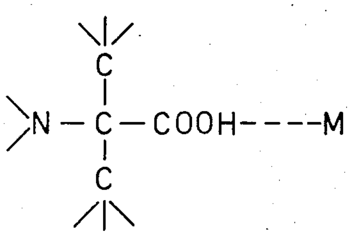
FIG. 4 shows the α-amino isobutyric acid molecule.

A further test was made, and the compound α-amino isobutyric acid was selected as being capable of taking the place of glycine in the crystal lattice. However, the molecular structure (FIG. 4) of this compound had a mirror plane of symmetry (M) so it was believed that it would not be suitable for use as a doping ingredient.

Doped crystals of triglycine sulphate were then prepared in the manner already described. Slices were cleaved from the crystals, and these were then etched and fitted with electrodes.

One slice was of thickness 0.4 mm and diameter 5.0 mm and the capacity measured across the electrodes was about 16 pF. Measured conductance G of 0.01 × $10^{-6}$ ohm$^{-1}$ was determined and a corrected value obtained for the resistivity of the specimen was 6 × $10^{8}$ ohm cm. The apparent pyroelectric coefficient of the material was 0.6 × $10^{18}$ coulombs cm$^{-2}$·°C$^{-1}$.

An electrostatic hysteresis loop for the α-amino isobutyric acid doped crystal is shown by the curve IV in FIG. 8. This loop is not displaced significantly in the X-direction from the origin indicating that the use of α-amino isobutyric acid as a doping ingredient had no appreciable effect. This is in accordance with the behavior that would have been expected from the consideration of the structure of this material that has already been discussed.

Figure 5:
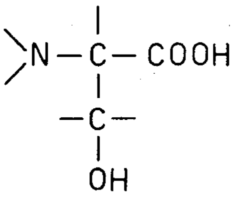
FIG. 5 shows the serine molecule.

To confirm these experimental results, a further test was carried out using as doping ingredient the compound serine the structural representation of which is given in FIG. 5. This compound lacks the necessary mirror plant of symmetry so it was through that it would act as a suitable doping ingredient.

A crystal of triglycine sulphate doped with serine was prepared in the manner already described. A test capacitor was made up which had a capacitance of 4.67 pF, and conductance G was measured as 0.0018 × $10^{-6}$ ohm$^{-1}$. A corrected value for the resistivity was determined as 1.0 × $10^{9}$ ohm cm and the apparent pyroelectric coefficient was 2.2 × $10^{-8}$ coulombs cm$^{-2}$·°C$^{-1}$. When an electrostatic hysteresis loop for this serine-doped material was determined it was found to be displaced in the X-direction from the origin confirming that the behavior of serine as a doping ingredient appeared to support the explanation given as to the working of the invention.

Figure 6:
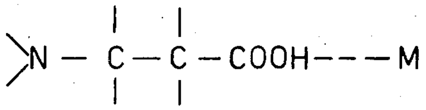
FIG. 6 shows the β-alanine molecule.

The compound β-alanine was also tested. This had the structural representation given in FIG. 6 and it is seen that a mirror plane of symmetry (M) is present so it would be expected that this compound would be of no use as a doping ingredient.

A crystal of triglycine sulphate doped with β-analine was prepared and a test capacitor was constructed. This had a capacitance of 3.0 pF and the conductance G was measured as 1 × $10^{-8}$ ohm$^{-1}$. A corrected value for the resistivity was determined as 7.5 × $10^{7}$ ohm cm and the apparent pyroelectric coefficient was 2.8 × $10^{-8}$ coulombs cm$^{-2}$·°C$^{-1}$. The electrostatic hysteresis loop for the β-alanine doped material showed no significant displacement in the X-direction which appeared to support the explanation given as to the working of the invention.

Figure 7:
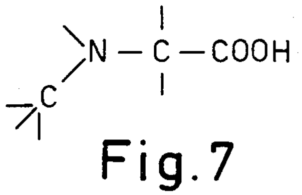
FIG. 7 shows the sarcosine molecule.

The compound sarcosine (FIG. 7) was also thought not to possess a pseudo-mirror plane so that it might form a suitable doping ingredient. A triglycine sulphate crystal doped with sarcosine was found to be poled so that the electrostatic hysteresis loop was displaced from the origin. Sarcosine therefore is a further suitable material that can be used as a doping ingredient.

All the capacitance and conductance measurements referred to were made at a frequency of 1,592 Hz and 17°C.

Figure 9:
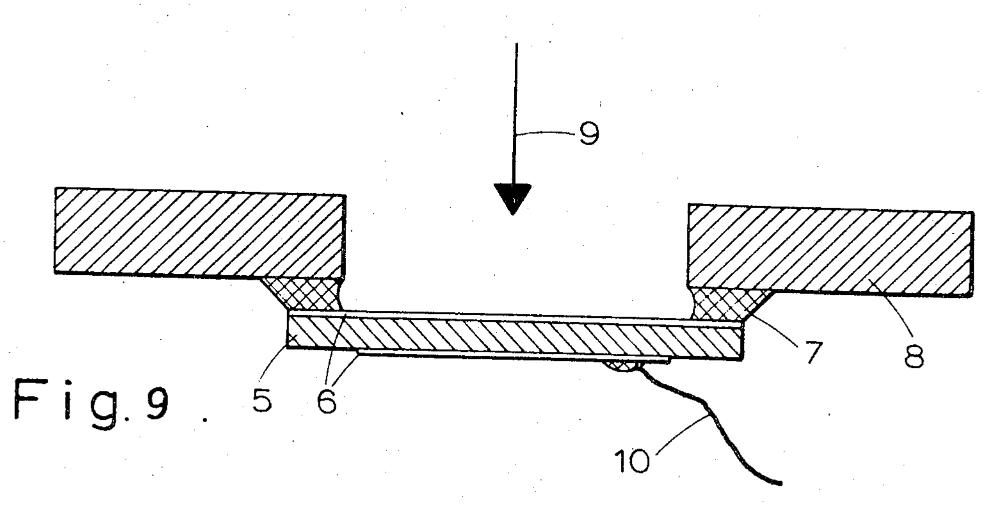
FIG. 9 shows one method by which a slice of poled triglycine sulphate crystal can be mounted to form a detector element.

One way in which a slice of a poled triglycine sulphate crystal was mounted to form a detector element is depicted in FIG. 9. This shows a slice 5 of a poled crystal which has had thin electrodes 6 of a nickel-chromium alloy deposited by evaporation on its major surfaces. The upper electrode of the slice 5 was joined by means of a film 7 of electrically conducting adhesive to a brass substance 8 having a window through which radiation 9 could be directed onto the poled crystal.

The substrate 8 thus formed one electrical connection to the poled crystal and a second connection was formed by a single lead 10 attached by means of electrically conducting adhesive to a lower electrode of the slice 5.

Figure 10:
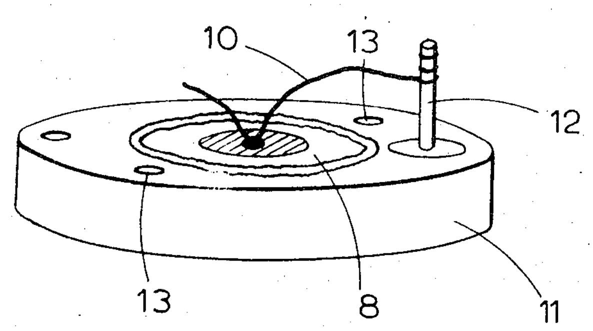
FIG. 10 shows the construction of one form of detector element.

For constructing a single-element detector, the substrate 8 was then mounted by means of conducting adhesive on a plate supporting element 11 as seen particularly in FIG. 10. The signal lead 10 was soldered to an insulated stand-off 12. The supporting element included mounting holes 13 by which it could be mounted to enable a detector device to be constructed.

Figure 11:
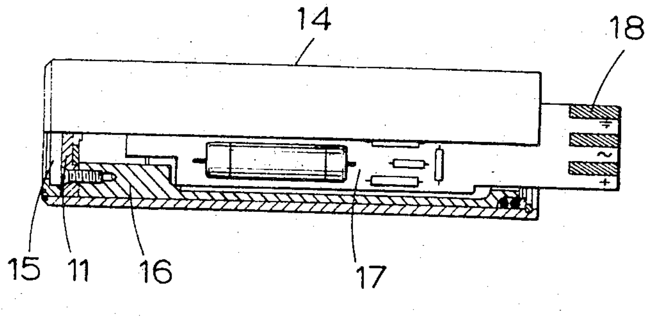
FIG. 11 shows partly in section an infrared detector device including the detector element.

One form of infrared detector device is shown partly in section in FIG. 11. This shows the plate supporting element 11 mounted within a cylindrical housing 14 behind a window 15 capable of transmitting infrared radiation. The supporting element 11 is bolted to a bulkhead 16 in the housing and electrical connections are led through the bulkhead to an output amplifier for the device which is carried on a printed circuit board 17 in the housing. External electrical connections to the device are provided by printed board connections 18 which emerge from the housing 14 through a suitable seal.

Figure 12:
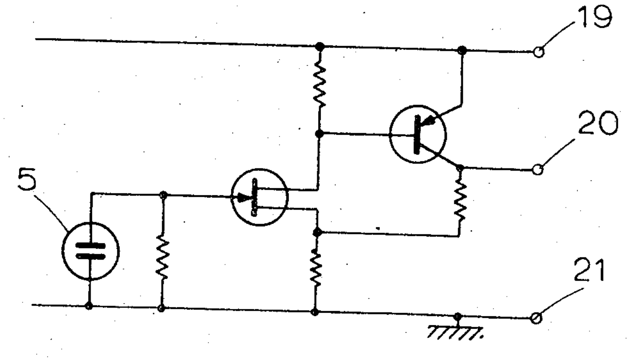
FIG. 12 shows an amplifier circuit constructed on a printed board for the device of FIG. 11.

The output amplifier is a straightforward two transistor circuit which is shown in greater detail in FIG. 12. One of the transistors is a bipolar type and the other is a field effect type. The electrical terminals of the amplifier which form the printed board connections 18 are a positive supply terminal 19, an output terminal 20 and an earth terminal 21. The circuit diagram also shows the connections to the two electrodes carried on the slice 5 of the poled crystal.

The invention is not limited to the method of forming a crystal of the ferroelectric material at a temperature below the Curie temperature of the material. However, if it is required to crystallize the material at a temperature above the Curie temperature then it will generally be necessary to provide a suitable optically active form of the selected ingredient for the doping addition.

Any of the doping ingredients disclosed in this specification can be employed for the triglycine sulphate, selenate or fluoroberyllate compounds interchangeably. In addition, useful doped crystals may also be made from mixtures of these compounds whether or not the hydrogen has been replaced with deuterium. One particularly useful type of poled crystal has been made from a mixture of triglycine sulphate and triglycine selenate.

The foregoing descriptions of embodiments of the invention have been given by way of example only and a number of modifications may be made without departing from the scope of the invention. For instance, the use of α-amino-n-butyric acid as a doping ingredient could alternatively be applied in crystals of triglycine selenate.

What we claim is:

1. A permanently poled ferroelectric material, said material consisting essentially of crystals of triglycine esters, selected from the group consisting of triglycine sulfate, triglycine selenate, triglycine fluoroberyllate and deuterium substitution products thereof, doped with a doping ingredient selected from the group consisting of α-alanine, α-amino-n-butyric acid, serine and sarcosine in an amount capable of preventing a ferroelectric inversion in the crystal.

2. The ferroelectric material of claim 1 wherein the triglycine ester is triglycine sulfate.

3. The material of claim 1 wherein the doping ingredient is α-alanine.

4. A method of preparing poled crystals of a ferroelectric material comprising growing crystals from a solution of a triglycine ester selected from the group consisting of triglycine sulfate, triglycine selenate and triglycine fluoroberyllate and deuterium substitution products thereof and a sufficient amount of a doping ingredient selected from the group consisting of α-alanine, α-amino-n-butyric acid, serine and sarcosine to cause the resultant crystals to be permanently poled.

5. An infrared detector device including the poled material of claim 1.

* * * * *